US00RE36332E

United States Patent [19]

Pierce et al.

[11] E Patent Number: Re. 36,332

[45] Reissued Date of Patent: Oct. 12, 1999

[54] REFRIGERATION OF SUPERCONDUCTING MAGNET SYSTEM

[75] Inventors: James G. Pierce, Westerville, Ohio; Charles B. Hood, Naples, Fla.; Sibley C. Burnett; John R. Purcell, both of San Diego, Calif.

[73] Assignee: PHPK Technologies, Inc., Westerville, Ohio

[21] Appl. No.: 09/033,946

[22] Filed: Mar. 2, 1998

Related U.S. Patent Documents

Reissue of:

[64] Patent No.: 5,495,718
Issued: Mar. 5, 1996
Appl. No.: 08/182,439
Filed: Jan. 14, 1994

[51] Int. Cl.[6] ..... F17C 5/02

[52] U.S. Cl. ..... 62/47.1; 62/51.1

[58] Field of Search ..... 62/47.1, 51.1

[56] References Cited

U.S. PATENT DOCUMENTS 4,543,794 10/1985 Matsutani et al. ..... 62/47.1
4,766,741 8/1988 Bartlett et al. ..... 62/47.1
4,790,147 12/1988 Kuriyama et al. ..... 62/47.1
4,796,433 1/1989 Bartlett ..... 62/47.1
5,150,578 9/1992 Oota et al. ..... 62/47.1

*Primary Examiner*—Ronald Capossela

[57] ABSTRACT

A refrigeration system includes a dewar and a refrigerator/liquefier which meets the variable demands of a superconducting magnet within the dewar. The system is sized to meet average loads over a defined duty cycle, and is variably operable to meed demands. In the preferred embodiment, a first supply of fluid circulates through a "condenser" element positioned in a dewar ullage to liquefy a separate supply of fluid in the dewar, and to refrigerate a pulsed cryogenic load therein, such as a superconducting magnet. A portion of the first supply of fluid may be diverted to refrigerate a second pulsed cryogenic load, such as magnet current leads permanently connected to the magnet. The dewar includes a cold gas vapor storage chamber separate from the dewar ullage, and the chamber is preferably located within the inner core of a solenoid superconducting magnet for compact and thermally efficient design. Responsive, independent adjustment of refrigeration to pulsed cryogenic loads is made possible.

28 Claims, 2 Drawing Sheets

REFRIGERATION OF SUPERCONDUCTING MAGNET SYSTEM

Matter enclosed in heavy brackets [ ] appears in the original patent but forms no part of this reissue specification; matter printed in italics indicates the additions made by reissue.

BACKGROUND OF THE INVENTION

The present invention relates to cryogenic refrigeration systems, and in particular to cryogenic refrigeration systems for superconducting magnetic energy storage systems and other pulsed cryogenic load systems.

Among the emerging industrial uses for superconducting components are superconducting magnetic energy storage (SMES) systems which may be used to store and instantaneously provide electrical power to offset damaging voltage dips and sags caused by various conditions, such as routine circuit-switching at power substations or peak demands at locations remote from substations.

Although lasting a fraction of a second, voltage dips can cause significant damage to electronic controllers essential to manufacturing operations. Uninterrupted power sources are thus critical to prevent idling entire manufacturing plants, and local SMES systems have been proposed and installed to protect manufacturing operations. Numerous other applications of SMES systems are possible to prevent damaging and undesirable voltage dips or voltage sags.

Voltage sags can be equally damaging to other systems. For example, in the operation of the Bay Area Rapid Transit District (BART) system, the long distance between the traction rectifier substations at each end of a 3.5 mile long trans-bay tube permits the train voltage to drop to undesirably low levels under certain conditions. Such conditions occur during peak demand times when the number of trains causes the entire power grid to sag. When trains pass near the central portion of the trans-bay tube, the voltage can dip to an undesirably low level. Train drive choppers cut out if the voltage falls below 750 volts (for a nominal 1000 volt DC system), resulting in jerky motion of the passing trains, increased train maintenance, and passenger discomfort and anxiety. SMES systems have been proposed for installation in the gallery of the BART trans-bay tunnel generally between its ends to provide needed power to prevent such sags. The frequency at which the magnet of the SMES unit will be required to pulse will be generally predictable, and presents an intermittent, non-continuous load requirement on a 24-hour cycle. By contrast, less demanding requirements are anticipated for SMES installations at manufacturing facilities, where occasional, random demand for pulsing of the magnet arises from voltage dips or sags. Equalized, uninterrupted power supplies are, thus, of importance not only to private manufacturing systems, but are necessary for safe and economical operation of major systems serving the public.

The need to equalize power supplies and prevent voltage dips provides the opportunity for SMES systems to supplement power grids and even eliminate power substations within electrical power systems. Essential to commercial viability of SMES applications is a reliable and economical cryogenic refrigeration/liquefaction system which can supply needed refrigeration at liquid helium temperatures to sustain the superconducting devices therein. Because an estimated 80% of SMES system operating costs relate to the power demands of refrigeration, highly efficient refrigeration/liquefaction systems are desired. In addition, the cryogenic temperatures at which SMES systems must operate place a premium on system design for low thermal losses and high thermal efficiency to further reduce loads which increase power demand. Finally, for some applications, the need for a compact SMES design is at a premium, such as the use of a SMES in the dimensionally restricted gallery of the BART transbay tunnel.

Accordingly, the need exists for high reliability, high efficiency refrigeration/liquefaction systems which operate with low thermal losses, to satisfy the demands of various existing and emerging applications for SMES systems and devices, and other pulsed cryogenic load systems.

SUMMARY OF THE INVENTION

The present invention satisfies that need with a refrigeration/liquefaction system designed to provide for high efficiency, low cost operation which satisfies steady state and peak refrigeration requirements of pulsed cryogenic load systems, such as magnets used in SMES systems. The system components minimize thermal losses and include features which permit compact system configurations for dimensionally restricted areas.

In accordance with the present invention, a refrigerator/liquefier system including numerous liquefier parts operatively interconnected, such as a gas compressor and a refrigerator, further includes a condenser element. A first supply of fluid circulates through the system in a closed loop. The liquefier system further includes a dewar defining a volume including ullage for a second supply of fluid isolated from the first supply. In normal operation, by the time the first supply of fluid circulating in the liquefier system reaches the condenser element it has become a cryogenic fluid, and its circulation through the condenser element liquefies the second supply of fluid in the dewar to produce liquid cryogen therein. The liquid cryogen produced in the dewar is then used to refrigerate a load, such as the pulsed cryogenic load presented by a superconducting magnet for a SMES system. In that application, the magnet is preferably disposed in the dewar itself to minimize heat loss. As well, because magnets used in SMES systems must be connected at all times due to the intermittent and immediate need for charging and discharging, a portion of the closed loop flow also returns to the compressor through the magnet current leads to provide refrigeration thereto. While the heat of vaporization of the first supply of fluid is used to condense the second supply of fluid at the condenser element 20, the magnet current leads use the sensible heat of the cold vapor to cool the magnet current leads such that their warm ends are at ambient while their cold ends are at magnet temperatures.

Isolating the circulating gas supply from the dewar gas supply increases the mean time between failure or between scheduled maintenance of the liquefier system, because the high purity circulating gas is not contaminated by intermixture with the dewar gas which becomes dirty through contact with the magnet, or contaminated by atmospheric gas during cooldown and venting. Dirty or impure circulating gas adversely effects the operation of various components, particularly expansion engines and expansion valves where contaminants or impurities deposit and promote wear. Placement of the magnet in-the dewar permits a portion of the return flow from the condenser element to also efficiently satisfy the refrigeration requirements of the magnet current leads.

In a further aspect of the present invention, the magnet current leads are designed with a dual set of passages. One set of passages is provided for cooling by the closed loop circulation of gas in the refrigeration/liquefaction system just described. A second set of passages is provided for use during initial cooldown of the magnet and current leads. During initial cooldown, a separate supply of liquid helium is transferred into the dewar volume itself, and vents out through the second set of passages to the atmosphere. This arrangement solves the problem of purging the dewar, and initial cooldown of the magnet leads, while allowing use of a closed loop refrigerator with a separate gas supply isolated from the dewar volume during normal operation.

In a still further aspect of the present invention, the dewar includes an inner vessel defining a volume for liquid cryogen including ullage thereabove and a separately defined cold vapor storage chamber. A cold vapor line extends from the ullage to the cold vapor storage chamber, and conveys vapor therebetween. In the preferred embodiment, the cold vapor storage chamber is positioned below the ullage, is at least partially surrounded by the superconducting magnet, and is at least partially disposed below the liquid level in the dewar. A highly efficient, compact design is provided where the superconducting magnet is generally cylindrical in shape and has an inner bore wherein the cold vapor storage chamber is positioned.

Such dewar design, made possible by isolating the circulating gas supply, is not only compact, but eliminates the need for an additional system component to store cold gas vaporized due to magnet operation. Moreover, because cold gas generated during pulsed operation can be stored, the refrigerator of the present invention can be smaller, and sized to meet an average load, rather than required to satisfy the peak load presented during pulsing.

In this regard, in a still further aspect of the present invention, a method for low-cost refrigeration of a superconducting magnet is disclosed in which a helium liquefier is variably operated in a closed loop, isolated from the dewar volume, in response to load requirements to deliver different quantities of refrigeration to the condenser element for liquefaction of helium in the dewar volume, and to deliver different quantities of refrigeration to the magnet leads. The dewar preferably includes a cold vapor storage volume in accordance with the present invention. Retention of gas evolved during pulsing within the dewar volume permits dewar pressure to be a reliable indicator of load requirements at the magnet load. The dewar vapor pressure in the ullage is sensed to determine the demand for flow at the condenser element, while the magnet lead resistivity (or temperature) is sensed to determine the demand for refrigeration at the magnet leads. Independent adjustment of the refrigeration supplied to the two loads is possible. Varying the position of a control valve associated with the magnet current leads varies the refrigeration delivered to the magnet current leads, and varying the compressor capacity control valve varies the refrigeration supplied to the magnet. Using these two means for control, the system can provide whatever ratio is required between these two loads and compensate for variations in the loads.

Variable operation permits the system at one level of operation to supply refrigeration to condense liquid helium at a rate substantially satisfying steady-state refrigeration requirements of the superconducting magnet and current leads. At other levels of operation, up to a maximum level of operation, liquid helium may be condensed at a higher rate substantially satisfying steady-state refrigeration requirements of the superconducting magnet plus an additional amount which, over time, accumulates a buffer volume of liquid helium in the dewar to substantially satisfy the magnet pulse refrigeration requirements which occur during at least one pulse of the superconducting magnet in real time.

In accordance with the method of the present invention, variable or selective operation of the system reduces power usage and operating costs during steady state operation of the system. Moreover, operation to produce additional liquid to accumulate a buffer volume in the dewar to absorb additional magnet head loads arising during pulsing of a SMES magnet, obviates the need for over-design of the liquefier capacity to meet transient peak refrigeration requirements. Rather, refrigeration design capacity can be based on the average refrigeration requirement over a defined duty cycle of pulsing, allowing use of a smaller capacity, more compact, and lower cost refrigerator/liquefier system. In accordance with the method, isolation of the gas supply circulating in the refrigerator from the gas supply condensing in the dewar, avoids contamination of the circulating gas supply by contact with the magnet or by atmospheric gases during cooldown and venting, reducing the mean time between failure or maintenance, and improving overall system reliability.

DETAILED DESCRIPTION OF THE PREFERRED EMBODIMENTS

Figure 1:
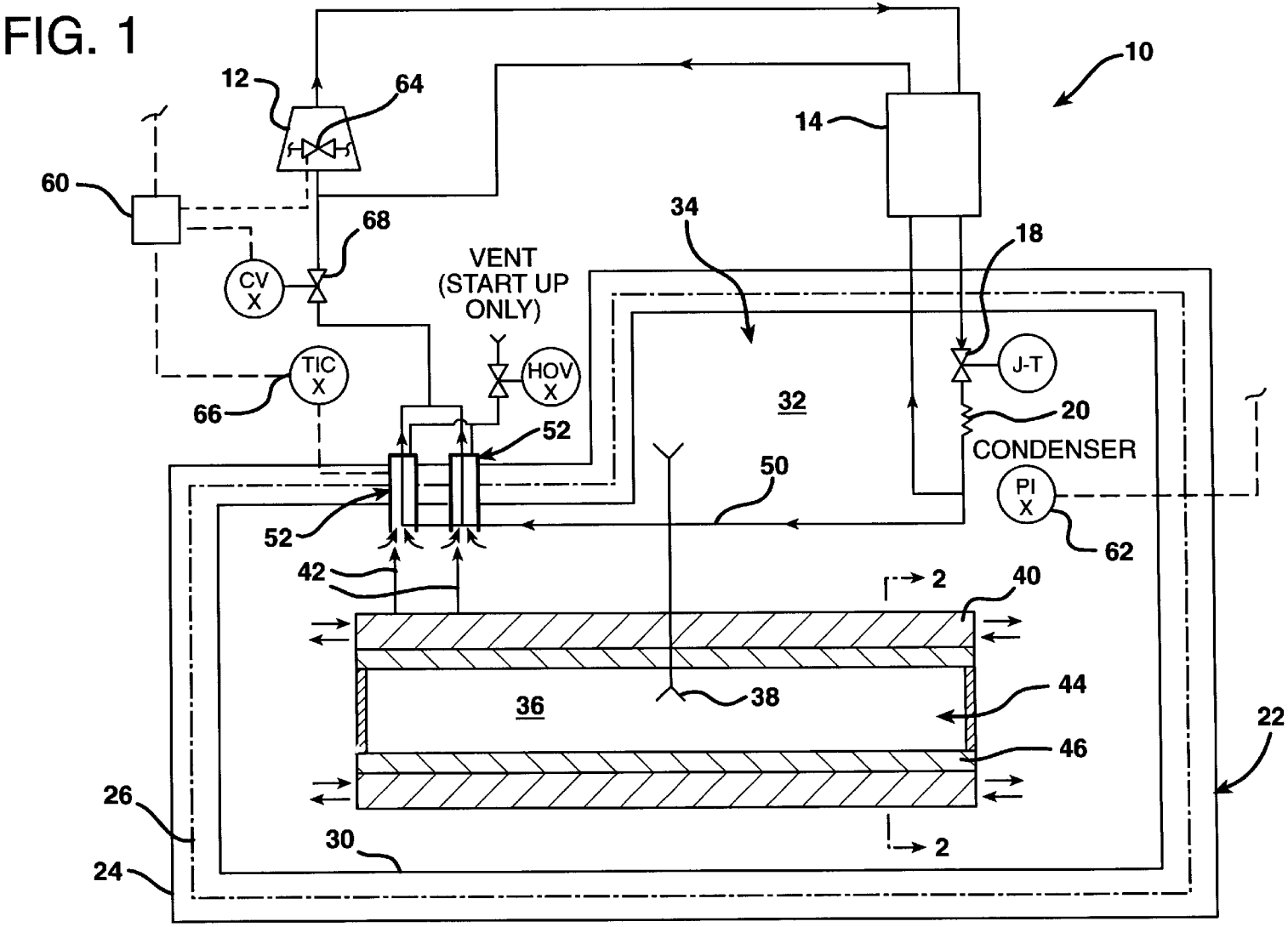
FIG. 1 is a schematic diagram of the system and dewar of the present invention in the preferred embodiments thereof.

Referring to FIG. 1, the present invention is shown in its preferred embodiments, including a refrigeration/liquefaction system 10 designed to operate in a plurality of modes to provide for high efficiency operation, satisfying steady state and non-continuous, intermittent peak refrigeration requirements of magnets used in SMES systems and other pulsed cryogenic load systems. In addition to providing all needed refrigeration requirements for the SMES system, the refrigeration system 10 incorporates features which minimize thermal losses and permit compact configurations for dimensionally restricted areas.

As used herein, the term "fluid" refers to gas and liquid states, and "cryogenic fluid" refers generally to fluids which have a temperature of less than about 110° Kelvin (°K) at atmospheric pressure. The term "cold gas" refers generally to gases cooled below room temperature, and "vapor" is also used to refer to a gas generally at cryogenic temperatures less than about 110° K. The terms, "dewar" and "cryostat" may be used to herein to refer to the same component.

Referring to FIG. 1, in accordance with the present invention, the refrigerator/liquefier incorporates certain conventional elements such as piping, valves, and filters, as well as major components of gas compression systems such as a gas compressor 12 and refrigerator 14. Valves shown are generically denoted HOV and CV for hand-operated valve and control valve, respectively. The types of gas compressor 12, refrigerator 14, and other liquefier elements are not critical to the present invention, and are commercially available with standard or special design capacities.

An expansion valve 18 is shown disposed in the dewar 22, and a condenser element 20 is shown downstream from the expansion valve 18 to receive fluid flow therefrom. The condenser element 20 is configured for heat exchange with and condensation of gas outside condenser element 20. From the condenser element 20 gas or vapor circulating therein returns to the compressor suction, either back through the refrigerator or through the magnet current lead line 50 to refrigerate the magnet current leads 52. A first supply of fluid circulates in the closed loop thus formed through the compressor 12, refrigerator 14, expansion valve 18, and condenser element 20, and return lines to the compressor suction.

The system 10 of the present invention further includes a dewar 22 for cryogenic fluid, including an outer vessel 24, and inner vessel 30 defining a volume 32 for storage of cryogenic liquid, and ullage 34 thereabove. The condenser element 20 is positioned in the dewar 22 extending through the ullage 34 for heat exchange with vapor or gas of a second supply of fluid in the dewar 22. As may be understood from FIG. 1, the second supply of fluid in the dewar 22 is isolated from the first supply of fluid circulating through the components forming the closed loop. In normal operation, by the time the circulating fluid in the closed loop reaches the condenser element 20, it has become a cryogenic fluid.

At its simplest, the condenser element 20 includes at least one fluid flow path and its configuration for heat exchange with vapor or gas in the ullage 34 can be straight, curved, finned or any other form appropriate for heat exchange between the fluid supplies. The liquid cryogen thereby condensed in the dewar 22 is then used to refrigerate a load, such as a superconducting magnet 40 for a SMES system, which is preferably disposed in accordance with the present invention in the dewar 22 itself to minimize heat losses. As the circulating first supply of fluid and the second supply of fluid in the dewar 22 are isolated from each other, and as there are no consumption uses thereof, after initial cooldown of the liquefier system 10, it may be understood that the system 10 is operable substantially without need for replenishment of either supply of fluid, particularly, the second supply of fluid in the dewar 22. Provision is made for venting gas from the dewar 22 through the magnet current leads and an HOV during initial purging start-up, and a safety relief valve (not shown) is also provided for overpressure relief in the dewar 22.

In the preferred embodiment of the invention, the refrigerator may further provide cold gas from the first supply of fluid through auxiliary shield supply and return lines (not shown) to actively cool the dewar shield 26. To this end, FIG. 1 further shows a thermal shield 26 generally disposed between the dewar outer vessel 24 and inner vessel 30 to absorb direct thermal radiation from the outer vessel 24. As the magnet is disposed in the dewar in the preferred embodiment, the dewar shield 26 also functions to shield the magnet from thermal radiation. This preferred arrangement permits system operation with a single refrigeration system 10 and single cryogen providing refrigeration for all loads. Alternatively, thermal shields 26 may be cooled with a separate liquid nitrogen supply system (not shown).

In accordance with the present invention, the liquefier system 10 is sized to satisfy the average needs for refrigeration of at least one pulsed cryogenic load over a defined duty cycle. By way of example and not limitation, where a superconducting magnet for a SMES is the pulsed cryogenic load disposed in the dewar 22, a SMES applied to an application such as the BART system permits estimation of the frequency, occurrence, and load presented by magnet pulses needed in the system over a 24 hour duty cycle. That is, typically, undesirable power sags occur during morning and evening rush hours, with fewer occurrences between 9 A.M. and 3 P.M., and even fewer from 7 P.M. to 7 A.M. When conditions indicative of a possible sag occur (approaching trains are sensed and the power grid is reduced to given voltage levels), the magnet draws a charge from the grid. As the grid sags to a predetermined trigger level, the magnet discharges back into the grid. The charging and discharging activities generate additional heat in the nature of "pulses" requiring refrigeration. The SMES system is always electrically connected to the power grid, and the magnet current leads are permanently connected to the magnet, due to the instantaneous nature of the need for charging and discharging. there is a steady-state heat leak through the magnet current leads (even without electrical current flow) as well as other system heat leaks, which establish a baseline, steady-state load.

Given the frequency and size of peak demand, and the steady-state loads, the liquefier system of the present invention may be sized to meet an average demand, rather than the peak demand for refrigeration. The present invention thereby allows operation of smaller, more efficient refrigeration system, in which dewar volume is sized to include not only a volume of liquid cryogen sufficient to absorb steady state heat loads for operation of a superconducting magnet 40, but to further include an additional buffer volume to absorb heat loads accompanying at least one pulse of the superconducting magnet 40 in real time. Once peak loads pass, the system operates at high levels until the dewar vapor pressure returns to its set pressure (slightly above atmospheric pressure) and liquid level in the magnet dewar is reestablished.

In accordance with the present invention, additional thermal, operating, and space saving efficiencies are achieved by providing a separately defined cold vapor storage chamber 36 generally positioned in the dewar volume 32. A cold vapor line 38 extends from the ullage 34 to the cold vapor storage chamber 36 to convey vapor between the ullage 34 and cold vapor storage chamber 36 for storage of cold gas during periods when peak loads generate cold vapor at a rate higher than the liquefier can recondense it. In the preferred embodiment, the cold vapor storage chamber 36 is positioned below the ullage 34.

Moreover, preferably, where the superconducting magnet 40 is substantially positioned in the inner vessel 30, it is shaped to receive or at least partially surround a portion of the cold vapor storage chamber 36 in the dewar 22. The magnet is preferably immersed in cryogenic fluid with flow, generally indicated by arrows in FIG. 1, through channels (not shown) in the magnet 40. The magnet 40 can be in any of several conventional configurations, by way of example and not limitation, a solenoid (hollow cylindrical) shape, and toroidal shape. In the preferred shown in FIGS. 1 and 2, a highly efficient design for storage of cold vapor is provided where the superconducting magnet 40 has a generally hollow cylindrical shape and the cold vapor storage chamber 36 is positioned in the inner bore 44 of the magnet 40. The ends of the magnet mandrel 46 may be sealed to form the cold vapor storage space 36. More than one magnet 40 may be placed in the dewar 22, depending on the application.

Figure 2:
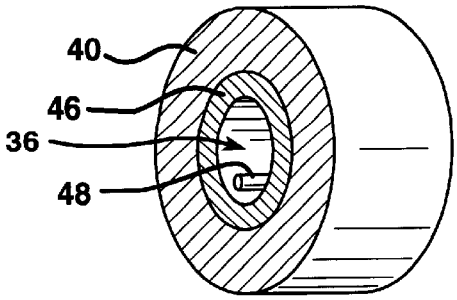
FIG. 2 is a schematic perspective detail view of the dewar of the present invention taken along line 2—2 in FIG. 1.

Referring to FIG. 2, the cold vapor storage chamber 36 may further include a heating element 48 disposed near the bottom of the chamber to provide a small thermal input in the event that any operating condition may temporarily establish conditions under which cold vapor could liquefy in the cold vapor storage chamber 36. So positioned, any small amount of liquid thus formed which does not effectively assist in refrigeration of the load, may be vaporized. The heating element 48 could, for example, comprise a small thermally conductive member extending into the chamber 36, or a small electrical heater.

Provision of the cold gas vapor storage chamber 36 in the dewar 22 in accordance with the present invention, eliminates the need for an additional system component to store gas vaporized due to magnet operation, permits a more compact design, and is more thermally efficient, thus lowering operating costs. Even where a particular magnet geometry permits only partial receipt of, partial shielding of, or partially surrounding the cold vapor storage chamber 36, storage and shielding requirements for the cold vapor are at least reduced. The liquefier system capacity, ullage 34 and cold vapor storage chamber 36 are sized depending on the application to provide a balance between peak loads and the maximum dewar pressure possible to maintain the magnet at operating temperature.

Less compact, less thermally efficient dewar and magnet designs are possible which may incorporate some features of the present invention. For example, the magnet 40 may be in a separate vessel (not shown) from the dewar inner vessel 30, connected thereto by a fluid transfer line (not shown), and the cold vapor chamber 36 located relative to the magnet 40 as previously described. Such an arrangement, however, increases thermal shielding requirements for the additional magnet vessel, and heat leak due to liquid transfer line losses.

Figure 3:
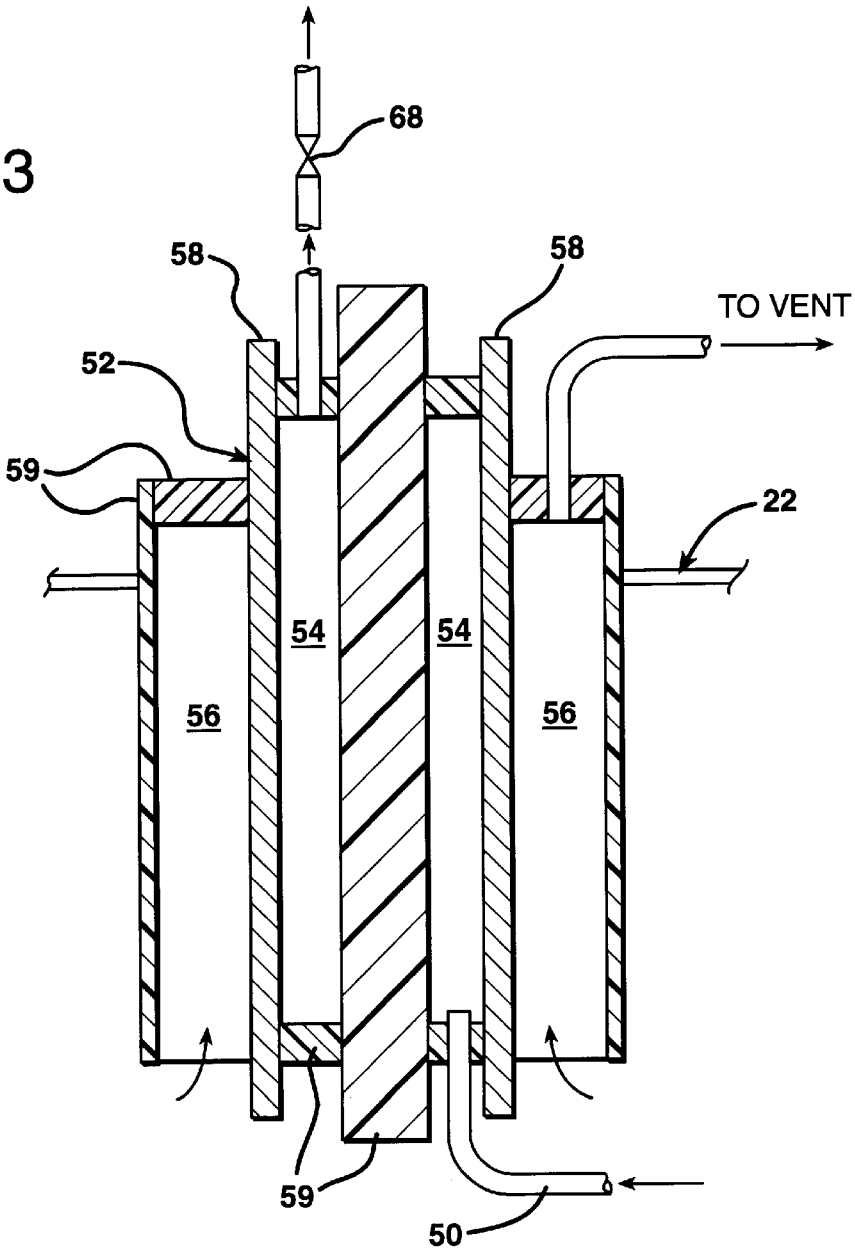
FIG. 3 is a schematic cross-sectional view of a magnet current lead of the present invention.

In accordance with a further aspect of the present invention shown in FIG. 3, the magnet current leads are preferably provided with two sets of refrigerant passages. One set of passages 56 connects to vent vapor or gas from the dewar 22 through the magnet current leads 52 for initial cooldown, and the other set of passages 54 are connected to the magnet current lead line 50, and form a closed loop which returns to the compressor suction. The magnet current lead is made of a metal conductor 58, preferably copper for electrical conductivity, but may be made of other metals, such as stainless steel and other electrically conductive materials having lower thermal conductivity. The connection of the magnet current lead to the magnet current lead line 50, dewar 22, and other lines must be insulated from the current carrying portion of the magnet current lead 52 by electrically insulating materials 59, preferably a low thermal conductivity material, such as G-10 or G-11 micarta, or other reinforced plastics and epoxy resins. While in operation, primary cooling of the current leads is provided by closed loop circulation of refrigerant through the passages 52, preferred placement of the magnet 40 in the dewar 22 further permits cold vapor therein to circulate around the magnet current leads 52 and provide incremental refrigeration to the magnet current leads 42.

Referring again to FIG. 1, variable and automatic operation of the liquefier in response to the need for refrigeration at one or more loads disposed in the dewar 22 is provided in accordance with the present invention. As shown in the illustrative two load application of a superconducting magnet 40 and magnet current leads 52, the liquefier 10 may be variably operated to independently adjust the quantities of refrigeration to the condenser element 20 for liquefaction of fluid in the dewar volume 32 and to the magnet leads 52 for cooling thereof. To this end, the dewar 22 preferably includes a dewar pressure sensor 62 to sense vapor pressure in the ullage 34. A pressure signal is sent from the pressure sensor 62 to a processor 60, such as a programmable processor, which determines the level of demand for refrigerant flow at the condenser element 20, and control a compressor capacity control valve 64, e.g. a compressor by-pass valve, representatively shown and typically provided in commercially available compressors to vary output therefrom. A magnet current lead sensor 66, such as a sensor measuring magnet current lead resistivity or temperature, whichever is most sensitive to temperature changes at the magnet current leads in a particular application, sends a magnet lead signal to the processor 60, which in turn varies the control valve 68 at the outlet of the magnet current leads to respond to demand for refrigeration at the magnet current leads 52. Independent adjustment of the refrigeration supplied to the two loads is thus possible by varying the position of a control valve associated with the currents leads, and by varying compressor output. Using these two means for control, the system can provide whatever ratio is required between these two loads and compensate for variations in the loads.

Using the liquefier of the present invention, a method for low-cost refrigeration of intermittent, pulsed cryogenic loads is further disclosed. A helium liquefier system 10 is provided in accordance with the present invention which is variably operated in response to the need for refrigeration of at least one pulsed cryogenic load over a defined duty cycle, and delivers corresponding quantities of refrigeration in a closed loop to the condenser element 20. The next step of condensing helium in the dewar volume 32 occurs at rates related to the quantities of refrigeration delivered to the condenser element 20. The step of condensing is performed at a maximum rate less than the peak refrigeration requirements of the pulsed cryogenic load during the duty cycle, and is variable up to a maximum rate substantially satisfying refrigeration requirements of the pulsed cryogenic load 40 while in steady-state operation, plus an additional amount which accumulates over a period of time a buffer volume of liquid helium in the dewar 22. The buffer volume is sized to substantially satisfying refrigeration requirements of the pulsed cryogenic load during at least one pulse thereof in real time. Refrigeration of the pulsed cryogenic load during steady state operation and pulsing thereof is thus possible with a smaller, more efficient system.

In the preferred method, refrigeration to two loads is independently adjusted using a pressure sensor 62 in the dewar ullage 34 and a processor 60 to control the compressor capacity valve 64, and a magnet current lead sensor 66 and the processor 60 to control a control valve 68, as set forth in detail above. Retention of gas evolved during pulsing within the cold vapor storage chamber permits the dewar pressure to be a reliable indicator of magnet load requirements for purposes of system control.

In accordance with the method of the present invention, variable operation of the system 10 and accumulation of a buffer volume of liquid permits cutting back system capacity to reduce power usage and operating costs.

The period over which the buffer volume accumulates liquid may vary with the particular system demands. Where the system 10 supports a SMES for use with a public transportation system, such as BART, there will be a 24-hour duty cycle where intermittent pulsing is required at generally predictable intervals, establishing the time period for recondensation of a buffer volume of liquid cryogen. Control instrumentation may be added to prevent magnet pulsing where dewar liquid level is below the level which represents the presence of a suitable buffer volume of liquid cryogen to avoid quenching the magnet. Other magnet controls and supporting equipment is conventional, and include sensors and power dump capability for quench avoidance.

It may be understood that the present invention may be used to provide systems 10 capable of operation to satisfy refrigeration requirements in different ranges for pulsed cryogenic loads of varying sizes. As well, it may be understood that while the preferred system 10 operates with helium comprising both the first and second supplies of fluid, it is possible (due to isolation of the gas streams) for different species of fluids to be used for the circulating first supply of fluid and second supply of fluid in the dewar. For example, in the event a high temperature superconducting magnet 40 is placed in the dewar 22, liquefaction of other species, such as hydrogen or neon, in the dewar 22 may be desired to provide refrigeration to the magnet 40. And, as may be appropriate, the circulating fluid may be hydrogen or neon rather than helium. Where helium is used as a circulating first supply of fluid for a higher boiling temperature supply of fluid in the dewar, system adjustments are required to ensure liquefaction rather than solidification of the fluid supply in the dewar.

It may be further understood that while operation with separate supplies of circulating and gas supplies is preferred, the condenser element 20 may be eliminated so that the expansion valve 18 produces liquid directly in a dewar otherwise constructed in accordance with the present invention. Thus, a single cryogen from a single source may be used for refrigeration and liquefaction. So configured, the cold gas return from the dewar may be regulated by a control valve (CV), such as control valve 68 shown on the return side of the magnet current leads to retain cold gas in the cold vapor storage chamber 36 substantially as set forth above, particularly during magnet pulsing. However, such a system is believed to be less thermally efficient, and is not preferred for reasons including increased difficulty in control, and contamination, as set forth above.

Although not shown in FIG. 1, to facilitate system start-up, the present invention may further include auxiliary liquid nitrogen systems and separate nitrogen circuits to pre-cool the dewar shield 26 and the gas flow through the refrigerator.

Although not shown, the electrical controls required to operate the system 10 of the present invention may be assembled by one skilled in the art, given the structure and method set forth herein. All materials are conventional unless otherwise indicated. Superconducting magnets, whether made of more conventional low temperature, or made of high-temperature superconducting material, may include additional structure, such as a jacket, as known in the art, and it is understood that such additional structure permits cryogenic fluid flow to refrigerate the superconducting magnet as necessary for operation thereof.

While certain representative embodiments and details have been shown for purposes of illustrating the invention, it will be apparent to those skilled in the art that various changes in the system, components, and methods disclosed herein may be made without departing from the scope of the invention, which is defined in the appended claims.

What is claimed is:

1. A liquefier for supplying cryogenic fluid to refrigerate at least one load, said liquefier comprising liquefier parts, including:

a compressor, refrigerator, and a condenser element downstream therefrom, operatively interconnected and defining a closed loop flow path for a first supply of fluid, and wherein said condenser element is configured for heat exchange with gas outside said flow path therethrough; and a dewar defining a volume for storage of a cryogenic liquid including ullage thereabove, said cryogenic liquid produced from a second supply of fluid isolated from said first supply of fluid for refrigeration of at least one load;

wherein said condenser element of said evaporation component is positioned in said dewar to liquefy said second fluid in the dewar to refrigerate a load; and wherein said liquefier further includes:

a load positioned for substantial immersion in cryogenic liquid produced from said second fluid; and a separately defined cold vapor storage chamber suitable for storage of liquid cryogen, said cold vapor storage chamber being at least partially surrounded by said load, generally positioned below the cryogenic liquid level substantially immersing said load, and connected to communicate with cold vapor generated by operation of said load.

2. The liquefier of claim 1 wherein said first supply of fluid comprises a first quantity of gas selected from the group consisting of helium, hydrogen, and neon.

3. The liquefier of claim 1 wherein said second supply of fluid comprises a second quantity of gas selected from the group consisting of helium, hydrogen, and neon.

4. The liquefier of claim 1 wherein said cold vapor storage chamber is connected to communicate with cold vapor generated by operation of said load by a cold vapor line extending thereto and positioned to receive vapor generated by said load.

5. The liquefier of claim 4 wherein:

said dewar further comprises a pressure sensor connected to sense the vapor pressure in said ullage and send a pressure signal related thereto;

said compressor includes a capacity control valve to vary the flow rate from the compressor; and said liquefier further includes a processor to receive said pressure signal and operate said capacity control valve in response thereto.

6. The liquefier of claim 1 wherein said dewar includes said load comprising at least one superconducting magnet disposed therein and having a pair of magnet current leads permanently connected to said magnet to convey electricity between a source of electricity and said magnet.

7. The liquefier of claim 6 wherein said liquefier further includes:

a magnet current lead supply line extending from a point downstream of said expansion valve to said pair of magnet current leads to supply refrigeration thereto; and a control valve positioned to regulate flow through said magnet lead supply line and said magnet current leads;

a sensor to sense the need for refrigeration at the magnet current leads and send a lead signal related thereto; and a processor to receive said lead signal and operate said control valve in response thereto.

8. The liquefier of claim 7 wherein:

said dewar further includes a pressure sensor connected to sense the vapor pressure in said ullage and send a pressure signal to said processor;

said compressor includes a capacity control valve to vary the flow rate from the compressor;

said processor receives said pressure signal and operates said capacity control valve in response thereto.

9. The liquefier of claim 1 wherein said load is generally cylindrical in shape and has an inner bore wherein said cold vapor storage chamber is at least partially positioned.

10. The liquefier of claim 1 wherein said load includes surfaces which form a portion of said cold vapor storage chamber.

11. The liquefier of claim 1 wherein said load is a superconducting magnet.

12. A liquefier for supplying cryogenic fluid to refrigerate at least one load, said liquefier comprising liquefier parts, including:

a compressor, refrigerator, [refrigerator,] and a condenser element downstream therefrom, operatively interconnected and defining a closed loop flow path for a first supply of fluid, and wherein said condenser element is configured for heat exchange with gas outside said flow path therethrough; and a dewar defining a volume for storage of a cryogenic liquid including ullage thereabove, said cryogenic liquid produced from a second supply of fluid isolated from said first supply of fluid for refrigeration of at least one load;

wherein said dewar comprises:

an outer vessel;

an inner vessel defining said volume suitable for storage of a liquid cryogen including ullage thereabove, said volume further including a separately defined cold vapor storage chamber generally positioned therein, wherein said cold vapor storage chamber is positioned below said ullage space; and a cold vapor line extending from said ullage to said cold vapor storage chamber;

whereby vapor may be conveyed between said ullage and said chamber, and stored in said chamber at cryogenic temperatures; and wherein said condenser element of said evaporation component is positioned in said dewar to liquefy said second fluid in the dewar to refrigerate a load.

13. The liquefier of claim 12 wherein said dewar further includes a load comprising a superconducting magnet, wherein said superconducting magnet is substantially positioned within said inner vessel to receive cryogenic fluid, and at least partially surrounds a portion of said cold vapor storage chamber.

14. The liquefier of claim 13 wherein said superconducting magnet is generally cylindrical in shape and has an inner bore wherein said cold vapor storage chamber is positioned.

15. The liquefier of claim 13 wherein, in said dewar, said volume for storage of liquid cryogen is sized to include a volume of liquid cryogen sufficient to absorb steady state heat loads for operation of said superconducting magnet plus an additional buffer volume of liquid cryogen to absorb peak heat loads accompanying at least one pulse of said superconducting magnet in real time.

16. The liquefier of claim 12 wherein said first supply of fluid comprises a first quantity of gas selected from the group consisting of helium, hydrogen, and neon.

17. The liquefier of claim 12 wherein said second supply of fluid comprises a second quantity of gas selected from the group consisting of helium, hydrogen, and neon.

18. A liquefier for supplying cryogenic fluid to refrigerate at least one load, said liquefier comprising liquefier parts, including:

a compressor, refrigerator, [refrigerator,] and a condenser element downstream therefrom, operatively interconnected and defining a closed loop flow path for a first supply of fluid, and wherein said condenser element is configured for heat exchange with gas outside said flow path therethrough; and a dewar defining a volume for storage of a cryogenic liquid including ullage thereabove, said cryogenic liquid produced from a second supply of fluid isolated from said first supply of fluid for refrigeration of at least one load; and wherein:

said condenser element of said evaporation component is positioned in said dewar to liquefy said second fluid in the dewar to refrigerate a load;

said dewar further includes a load comprising at least one superconducting magnet disposed therein to receive cryogenic fluid and having a pair of magnet current leads permanently connected to said magnet to convey electricity between a source of electricity and said magnet;

at least one of said magnet current leads includes two sets of refrigerant passages, a first set of passages to receive and convey refrigerant vapor or cold gas from a first source of refrigerant, and a second set of passages to receive and convey refrigerant vapor from a second source of refrigerant; and said at least one lead may be cooled by refrigerant flowing through either said first or second set of passages.

19. The liquefier of claim 18 wherein:

said magnet is positioned for substantial immersion in cryogenic liquid produced from said second fluid; and said dewar further includes a separately defined cold vapor storage chamber, generally positioned in said dewar below said ullage space, and connected to convey vapor between said ullage and said chamber.

20. The liquefier of claim 18 wherein said first supply of fluid comprises a first quantity of gas selected from the group consisting of helium, hydrogen, and neon.

21. The liquefier of claim 18 wherein said second supply of fluid comprises a second quantity of gas selected from the group consisting of helium, hydrogen, and neon.

22. A method for low-cost refrigeration of intermittent pulsed cryogenic loads comprising the steps of:

providing a helium liquefier, wherein said liquefier:

comprises liquefier parts operatively interconnected, including a condenser element defining a closed loop flow path for a first supply of helium, and a dewar defining a volume including ullage for a second supply of helium isolated from said first supply of helium, wherein said condenser element is disposed in said ullage; and wherein at least one pulsed cryogenic load is further disposed in said dewar volume;

variably operating said liquefier in response to the need for refrigeration of at least one pulsed cryogenic load over said defined duty cycle, and delivering corresponding quantities of refrigeration in said closed loop flow path to at least said condenser element;

condensing helium in said dewar volume at rates related to the delivered refrigeration, wherein said step of condensing is:

performed at a maximum rate less than the peak refrigeration requirements of said pulsed cryogenic load during said defined duty cycle; and variable up to a maximum rate satisfying steady-state refrigeration requirements of said pulsed cryogenic load, plus an additional amount which accumulates over time a buffer volume of liquid helium in said dewar substantially satisfying peak refrigeration requirements of said pulsed cryogenic load during at least one pulse thereof in real time; and refrigerating said pulsed cryogenic load in said dewar during steady-state operation and pulsing thereof.

23. The method of claim 22 wherein the step of condensing is performed generally between a minimum rate substantially satisfying steady-state refrigeration requirements of said pulsed cryogenic load and said maximum rate.

24. The method of claim 22 wherein:

the step of providing includes providing a dewar in which said dewar volume further includes:

a separately defined cold vapor storage chamber generally positioned therein generally below said ullage; and a cold vapor line extending from said ullage to said cold vapor storage chamber; and said method further includes storing helium vapor in said cold vapor storage chamber during pulsing, and removing helium vapor from said cold vapor storage chamber as needed during the step of condensing.

25. The method of claim 24 wherein the pulsed cryogenic load comprises a superconducting magnet, and the step of providing includes providing said superconducting magnet in a shape which receives at least a portion of said cold vapor storage chamber.

26. The method of claim 22 wherein:

the pulsed cryogenic load comprises a superconducting magnet having a pair of magnet current leads permanently connected thereto;

the step of providing includes further providing a magnet current lead supply line extending to said pair of magnet current leads to deliver refrigeration from said first supply of helium in a closed loop to said leads; and said step of variably operating said liquefier is performed in response to the need for refrigeration of both said magnet and said current leads.

27. The method of claim 26 wherein said step of variably operating comprises independently controlling the delivery of refrigeration to said magnet current leads and said magnet.

28. The method of claim 22 wherein: the pulsed cryogenic load comprises a superconducting magnet having a pair of magnet current leads connected thereto;

the step of providing includes:

providing a magnet current lead supply line extending to said pair of magnet current leads to deliver refrigeration from said first supply of helium in a closed loop to said leads; and providing a dewar in which said dewar volume further includes:

a separately defined cold vapor storage chamber generally positioned therein generally below said ullage; and a cold vapor line extending from said ullage to said cold vapor storage chamber;

said step of variably operating said liquefier is performed in response to the need for refrigeration of both said magnet and said current leads; and said method further includes storing helium vapor in said cold vapor storage chamber during pulsing, and removing helium vapor from said cold vapor storage chamber as needed during the step of condensing.

* * * * *